United States Patent [19]

Murphy

[11] Patent Number: 5,391,234
[45] Date of Patent: Feb. 21, 1995

[54] CLEANING OR STRIPPING COMPOSITION AND METHOD

[75] Inventor: Donald P. Murphy, Rochester Hills, Mich.

[73] Assignee: Henkel Corporation, Plymouth Meeting, Pa.

[21] Appl. No.: 964,733

[22] Filed: Oct. 22, 1992

Related U.S. Application Data

[63] Continuation-in-part of Ser. No. 739,952, Aug. 5, 1991, abandoned.

[51] Int. Cl.$^6$ .................. C23G 1/14; C11D 7/06; B08B 3/04
[52] U.S. Cl. .................. 134/38; 252/135; 252/139; 252/156; 252/159
[58] Field of Search .................. 134/38; 252/135, 156, 252/139, 159

[56] References Cited

U.S. PATENT DOCUMENTS

| | | | |
|---|---|---|---|
| 3,494,868 | 2/1970 | Gray | 252/99 |
| 3,553,144 | 1/1971 | Murphy | 252/158 |
| 3,563,900 | 2/1971 | Murphy | 252/135 |
| 3,615,827 | 10/1971 | Murphy | 134/38 |
| 3,663,447 | 5/1972 | Murphy | 252/156 |
| 3,663,476 | 5/1972 | Murphy | 252/529 |
| 3,671,465 | 6/1972 | Murphy | 252/158 |
| 3,766,076 | 10/1973 | Murphy | 252/156 |
| 3,819,529 | 6/1974 | Murphy | 252/156 |
| 3,972,839 | 8/1976 | Murphy | 252/548 |
| 4,539,133 | 9/1985 | Boskamp | 252/109 |
| 4,788,005 | 11/1988 | Castro | 252/539 |

*Primary Examiner*—Asok Pal
*Assistant Examiner*—P. Achutamurthy
*Attorney, Agent, or Firm*—Ernest G. Szoke; Wayne C. Jaeschke; Norvell E. Wisdom, Jr.

[57] ABSTRACT

A composition and method for stripping protective coatings from surfaces, particularly metal surfaces such as aluminum, without blemishing the metal surface comprises a silicate-containing, alkaline component and a product of chemical interaction in solution between silicate and acid other than silicic acid in an amount to inhibit attack of the substrate being cleaned or to which the coating was applied. Preferably the acid reacted with the silicate is gluconic, or most preferably, boric acid.

20 Claims, No Drawings

CLEANING OR STRIPPING COMPOSITION AND METHOD

CROSS-REFERENCE TO RELATED APPLICATION

This application is a continuation-in-part of application Ser. No. 739,952, filed Aug. 5, 1991, now abandoned.

BACKGROUND OF THE INVENTION

1. Field of the Invention

This invention relates to compositions and methods for cleaning, or for removing or stripping protective coatings from, surfaces, particularly alkali sensitive metal surfaces such as those of aluminum and zinc and their alloys, while reducing or avoiding attack on the surface during the stripping and/or cleaning.

2. Statement of Related Art

Objects are often provided with protective and/or decorative coatings such as paints, varnishes, lacquers, enamels and the like. For various reasons, including defects in the coatings or desire to change to a different coating, removal of the coating may become necessary. Because of the adhesion of the coatings to the surface and the durability of the coatings, it has often been difficult to remove the coating from the surface or to which it is applied.

Removal of coatings in the prior art has usually been accomplished by contacting the coated substrate with strong chemical compositions. Such compositions have generally been alkaline materials, including alkali metal hydroxides, alkali metal carbonates, alkali metal phosphates, and alkali metal silicates. In many situations, the removal or stripping compositions have had to be used at strengths and for periods of time which resulted in appreciable attack on the substrate to which the coating was applied, particularly when the substrate was aluminum, zinc, an alloy of one or both of these metals, or some other substrate similarly susceptible to attack by alkaline liquid reagents.

Various proposals have been made to overcome these difficulties by different additives to the alkaline stripping compositions which would make it possible to decrease the time of contact or otherwise inhibit the attack on the substrate to which the coating to be removed was applied. None of these proposals heretofore have been fully satisfactory in commercial practice.

DESCRIPTION OF THE INVENTION

In this description, except in the operating examples or where explicitly otherwise indicated, all numbers describing amounts of ingredients or reaction conditions are to be understood as modified by the word "about" in describing the broadest embodiments of the invention. Practice within the exact numerical limits given is generally preferred. Also, whenever groups of individual materials are described as suitable or preferred for the invention, it is to be understood unless otherwise stated that mixtures of more than one of the individual materials in a group are equally suitable or preferred.

SUMMARY OF THE INVENTION

It has now been found that alkaline aqueous solutions that contain silicates that have at least partially reacted with acids other than silicic acid are more useful as coating stripping compositions than when similar alkaline silicate solutions are used alone, or when similar amounts of anions of the acid(s) reacted with the silicates are introduced into the solutions directly from fully neutralized salts of the same acid(s). In a particularly preferred embodiment, when boric acid is mixed in aqueous solution with silicate, in a solution in which the pH does not exceed by more than 0.5 pH unit the pH of an aqueous solution containing the same concentrations of silicate and boric acid as its only solutes, there is sufficient chemical interaction between these two solutes to result in a solution which has a superior combination of a practically useful coating stripping speed and little or no blemishing of even brightly polished aluminum substrates from which coatings are to be removed, compared with previously known alkaline stripping solutions including a variety of alkaline materials. This result is not achieved if borax rather than boric acid is mixed in solution with silicates, or if the pH of an aqueous solution containing silicates is too high, because of the presence of some other alkalinizing agent such as alkali metal hydroxide, when boric acid is added to a solution already containing silicate. However, after the acid and silicates have been dissolved together initially for even a few seconds in an aqueous solution with a pH that is not too high, the pH of the solutions can be raised somewhat to increase the stripping rate without giving up the advantage of higher stripping rates for the same level of attack on the substrate that is achieved when solutions containing no materials more alkaline than the silicates themselves are used.

Accordingly, the necessary characteristics and constituents of a working composition according to this invention are that (i) the composition is an aqueous liquid composition having a pH of at least 12.0; (ii) the composition contains (A) an alkaline solute component including alkali metal silicate constituting at least about 10% of said alkaline solute component and (B) an amount of dissolved product of reaction between silicate and acid other than silicic acid that corresponds stoichiometrically to the presence of acid other than silicic acid in an amount of at least 2.5% of the amount of total alkali metal silicate dissolved in the composition; and (iii) the composition according to the invention is capable of passively stripping a standard thickness of coating of a commercial acrylic resin based lacquer (e.g., Duracron ™ 200 Acrylic) from a brightly reflective aluminum substrate, without causing any damage of the substrate surface visible to the unaided eye, in a time substantially shorter than that required for the same stripping, with the same lack of visible damage to the substrate surface, by a reference composition made with the same type and concentration of silicate(s) and other alkaline solutes as the composition according to the invention, but with the content of anions of acid(s) other than silicic acid in the reference composition supplied by fully neutralized salts containing such anions rather than by reaction between the acid(s) other than silicic acid and the silicate content of the composition in solution, and with the pH of the reference solution adjusted, if necessary, to match that of the composition according to the invention, with gluconic acid being used for the adjustment if needed to lower the pH and sodium hydroxide being used if needed to raise the pH. The term "passive" stripping means that no mechanical force, other than the minimum necessary to remove the substrate from the stripping composition and examine it to determine whether the stripping is complete, is used to aid the stripping process. The stripping time for the composition according to the invention is considered to be substantially less if the time is no more than 85%, more preferably no more than 75%, still more preferably no more than 65%, of the time required by the reference composition as described above.

A concentrated composition according to the invention may have too high an alkali content to be capable of removing a coating from polished aluminum as described above without damaging the surface. However, a concentrated composition is within the scope of the invention if a solution containing from 6 to 600 grams of the concentrated composition in deionized water qualifies as a working composition according to the invention as described above.

Still another alternative definition of the invention relies on a reference solution as described above, but, instead of comparing the speed of stripping a coating without damage to the substrate, it compares the relative damage to the substrate caused by a composition containing anionic species derived from interaction between silicate and acid(s) other than silicic acid against a reference composition made as described above, with salt instead of products of reaction between silicate and acid(s) other than silicic acid. If the composition derived from reaction between silicate and acid causes less damage to the surface when accomplishing the same amount of stripping under the same conditions as the reference composition, the composition derived from reaction with acid is within the scope of one embodiment of this invention.

In many cases when the preferred boric acid is used, the chemical interaction between silicate and boric acid that has occurred in compositions according to this invention can be conveniently recognized by measuring the nuclear magnetic resonance (hereinafter "NMR") spectrum of the $^{11}B$ isotope in the compositions. The $^{11}B$ NMR spectrum of boric acid solutions in deionized water alone has a single peak with a chemical shift of $-19.6$ parts per million (hereinafter "ppm") from the single peak of boron trifluoride etherate, the conventional definition of the zero point in $^{11}B$ NMR spectroscopy. If sodium hydroxide is added to the solution containing the boric acid, thereby converting it at least partially to salt, the $^{11}B$ NMR spectrum of the solution remains a single peak, but the chemical shift of the peak rises with increasing NaOH concentration to a maximum value of $-5.7$ ppm chemical shift from the standard in a solution containing 10% by weight of NaOH. (These values for boric acid in plain water and in sodium hydroxide solutions are taken from M. Dewar and R. Jones, *Journal of the American Chemical Society*, 89:10, pages 2408–2410 {1967}.) However, it has now been found that in compositions according to this invention with sodium silicate and boric acid, the $^{11}B$ NMR peak shifts to still higher values, having a value of $-1.6$ ppm in a solution containing 30% of sodium silicate and 6% boric acid, for example, even though the solution containing 30% sodium silicate has a lower pH value than a 10% sodium hydroxide solution. Therefore, a $^{11}B$ NMR peak with a chemical shift more positive than $-5$ from a boron trifluoride etherate standard is another indicator of a composition with boric acid according to this invention, alternative to the comparison with a reference solution made with borax as described above.

The invention also includes concentrate compositions useful in formulating working aqueous cleaning, or film-removing, compositions as described above by dilution with water; methods of removing coatings or films from surfaces of an article, which may be carried out in a reasonably short period of time without adverse effect on the appearance of substrate itself, particularly when the substrate is aluminum, zinc, an alloy of one or both of these metals, or another alkali sensitive surface, more particularly when the substrate surface is polished and/or brightly reflective. Inasmuch as the compositions of the present invention may also advantageously be used as cleaning compositions to remove soil, grease and the like, as well as for stripping compositions for removing coatings and films, the present invention also includes methods for such cleaning.

Thus, one aspect of the present invention involves an alkaline concentrate, which may or may not contain water, unless the concentrate includes compounds more alkaline than alkali metal silicates, in which case the concentrate must contain water so that the silicate and acid other than silicic acid will be able to interact in solution as already noted above. The concentrates are capable of being diluted with water to form an aqueous stripping solution having the desired concentration for use in a method of cleaning, or removing or substantially loosening decorative or protective films from metal surfaces to which they have been applied. Such coating materials generally include or contain acrylic, epoxy, vinyl, and/or alkyd resin coating components.

DESCRIPTION OF PREFERRED EMBODIMENTS

A concentrate material according to the present invention preferably contains alkaline solutes in an amount of at least 10% by weight of the concentrate. (Hereinafter all percentages stated are to be understood as percentages by weight unless explicitly stated to the contrary.) The concentrate, if liquid, may generally contain up to about 98% of these alkaline solutes. More desirably, the concentrate will contain from about 30, up to about 95%, of total alkaline solutes. Alkaline solutes utilized in concentrates and in aqueous stripping solutions prepared therefrom to provide the desired alkalinity must include silicates, preferably alkali metal silicates, still more preferably those with a composition corresponding to a silica to alkali metal oxide ratio in the range from 1.0:1.0 to 3.75:1.0. The silicate solutes may comprise the entire alkaline solutes, or may be employed in admixture with other alkaline materials, preferably those selected from the group consisting of hydroxides, carbonates, borates, phosphates, and mixtures thereof. For the purposes of this invention, the silicate material preferably comprises, with increasing preference in the order given, at least 10, 37, 60, or 75% by weight of the total alkaline solutes, and most preferably comprises 75 to 90% of the total alkaline solutes.

The alkali metal silicates of sodium and/or potassium are preferred and readily available commercially, sodium silicates being available from DuPont as Silicate F, having an $SiO_2$ to $Na_2O$ ratio of about 3.25:1 and from PQ Corp. as Silicate N having an $SiO_2$ to $Na_2O$ ratio of about 3.25:1 and potassium silicate available from PQ Corp. as Kasil ® #1 having an $SiO_2$ to $K_2O$ ratio of about 2.5 to 1, for example. Sodium metasilicate having an $SiO_2$ to $Na_2O$ ratio of about 1:1 is available from several suppliers.

Of the other alkaline materials employed along with the silicate, the sodium compounds, such as sodium hydroxide; sodium carbonate; mono-, di-, and trisodium phosphates; tetrasodium pyrophosphate; sodium tripolyphosphate; and the like are generally preferred. Other alkali metals such as lithium, cesium, rubidium and particularly potassium may also be employed. Tetrapotassium pyrophosphate, for example, is a desirable and readily available alkaline material.

As noted earlier above, boric acid, when added to silicate containing alkaline material under appropriate conditions, protects the surface of the substrate from attack by the stripping solution containing these materials when employed to remove the protective or decorative film or coating thereon. Thus, the combination of boric acid ($HBO_3$) and silicate, preferably metasilicate, with or without high ratio silicates, and with or without other alkaline materials, such as the alkali metal phosphates, carbonates, borates, or hydroxides, will effectively protect even highly polished aluminum from attack and corrosion or significant dulling. The same effect is not found when the salt borax, rather than boric acid, is added.

As would be expected from the ineffectiveness of borax, the pH of the solution in which the silicate and the acid(s) other than silicic acid are first mixed must not be too high, or the beneficial effect of the interaction between these two materials will not be obtained. With increasing preference in the order given, the pH of the aqueous solution in which the other acid(s) and silicate are mixed should not be greater than 0.42, 0.30, 0.25, 0.18, 0.10, or 0.05 pH unit higher than the pH of a reference solution that contains the same amounts of silicates and acid(s) other than silicic acid, but no other solutes. However, as soon as the acid, if added as a solid, is fully dissolved in such a silicate containing solution without too high a pH, or, if added as a liquid, has been completely mixed with the solution containing silicate, more alkaline materials may be added to raise the pH without destroying the beneficial effect.

The preferred boric acid will begin to be effective at levels of from 0.25 or 0.5% of a concentrate composition, dependent on the amount of alkali metal silicate and other alkaline solutes (hydroxide, phosphate, carbonate, etc.) employed in the concentrate. Amounts of boric acid up to about 10 or 12% by weight may be desirably employed. As amounts approach about 15%, some insolubility, flocculation, or incompatibility problems may be encountered in formulating the concentrate or the aqueous cleaning or stripping solutions prepared therefrom. Optimum levels of boric acid employed with alkali metal silicates alone, or in combination with the alkali metal hydroxides or phosphates as additional alkaline components, are normally achieved at about 5–10% boric acid levels in the concentrate.

More generally, it is preferred that the ratio by weight of the dissolved component of product of reaction between silicate and acid(s) other than silicic acid to the dissolved alkali metal silicate component in a composition according to this invention should be at least, with increasing preference in the order given, 0.025:1.0, 0.10:1.0, 0.18:1.0, or 0.25:1.0. In determining these ratios, the reaction product is measured as its stoichiometric equivalent of the acid(s) other than silicic acid that are actually used in the particular composition concerned.

The acid other than silicic acid used as part of the invention may be selected from a wide variety of acids. The minimum requirement is that it be a sufficiently strong acid to react with silicate ions in aqueous solution. All the common mineral acids such as hydrochloric, sulfuric, nitric, and phosphoric acids are suitable, as are the common not too weak and adequately water soluble organic acids such as acetic, formic, propionic, citric, and gluconic acids and many others apparent to those skilled in the art. As already noted, boric acid is the most preferred, because it exerts an exceptionally powerful effect of the desired kind. Next most preferred are the hydroxy and multihydroxy organic acids such as gluconic acid, which is desirable for other reasons as noted below.

Optional ingredients or components include those typically used in alkaline compositions which are formulated for aqueous cleaning or paint stripping compositions. A gluconic acid material, which serves as a chelating agent, is typically employed in the concentrate compositions. Such gluconic acid material is typically present in amounts up to about 10% by weight of the concentrate composition with amounts of about 2–7% being preferred. "Gluconic acid material" is intended to include and refer to gluconic acid itself, and to other water soluble and/or water dispersible forms of gluconic acid, such as the alkali metal gluconates and glucoheptonates, in particular to sodium gluconate and gluconodelta-lactone.

Other optional ingredients are surface active or wetting agents, including anionic, nonionic or cationic types which are soluble and effective in alkaline cleaning and stripping solutions; other adjuvants which include rinsing or dispersing agents such as lignin sulfonates, and materials which impart a pleasant odor such as pine oil. As with the gluconic acid material, these optional ingredients will typically be present in amounts up to about 10% by weight of the concentrate composition, with amounts of 0.1 to 5 or 7% being typically preferred when these materials are included.

The concentrate composition may be formulated into a working aqueous alkaline cleaning or stripping composition by dissolving the concentrate in water in an amount to provide the desired alkalinity to effect cleaning or substantial loosening of the paint or other films to which the composition is applied. The aqueous, silicate containing, alkaline cleaning and stripping compositions of the present invention will typically contain the concentrate composition in amounts of 6 to 600 grams per liter of solution, with 120 to 360 grams per liter being preferred for stripping and about 12 to 120 grams per liter ("g/l") for cleaning without stripping any dried long term protective coating.

In formulating the aqueous stripping composition from a concentrate, any accelerator composition to be employed is added to the aqueous stripping solution, if no accelerator has been included in the concentrate itself. When added to the formulated aqueous stripping solution, the accelerating composition, if employed, is preferably added in an amount of from about 0.5 to about 25% by volume of the stripping solution with amounts of about 1–10% by volume being preferred. This will correspond generally to having added an accelerator to the concentrate in an amount of about 2–40%, preferably 10–20%, of the concentrate composition. Preferably, however, the accelerating composition is added when formulating the aqueous alkaline stripping solution, rather than being a part of the alkaline concentrate itself, because the most desirable amounts of accelerator for the final working composition would often require more accelerator in the concentrate than is readily soluble therein.

In formulating the stripping solution the alkaline concentrate is preferably mixed with water in the desired amounts described earlier and the accelerator composition is then added in the desired percent by volume of the stripping solution as described above.

Typical accelerator composition which are preferably employed in formulating a working aqueous, silicate containing alkaline stripping solution containing the boric acid includes various phenols and phenol ethers, alkylene glycols, and alkylene glycol aryl ethers, preferably in admixture with organic nitrogen compounds. While the nitrogen compounds may be various amines, including aryl mono- and di-amines, such as aniline, cyclohexylamine, phenylene diamine, and hydroxyl containing amines, the preferred nitrogen compounds are those having the formula:

wherein each of $R^1$, $R^2$, and $R^3$ is independently selected from the group consisting of (i) hydrogen and of (ii) hydroxyalkyl and hydroxyalkoxy moieties having from 2 to 10 carbon atoms in each moiety and a terminal hydroxyl group in each moiety, except that at least one of $R^1$, $R^2$, and $R^3$ is not hydrogen. Preferred oxygen containing amines for accelerators will have a boiling point of at least 100° C. and a molecular weight not more than 500, with $R^1$, $R^2$, and $R^3$ moieties containing no more than 6 carbon atoms. Illustrative of such compounds are mono-, di-, and tri-ethanolamine, 2-amino-2-methyl-1-propanol, 2-amino-2-methyl-1,3-propanediol, 2-amino-2-ethyl-1,3-propanediol, tris(hydroxymethyl) aminomethane, diglycolamine, trihexanolamine, dioctanolamine, monodecanolamine, tributanolamine, and the like. Of these, triethanolamine is preferred and readily available.

Desirably, these organic nitrogen compounds, when employed in combination with other accelerator compounds, will be present in an amount of about 5–75% of the accelerator composition with the ratio by weight of other accelerator to nitrogen compound in the range of about 0.3:1.0 to 19:1.0.

The oxygen containing amines described above are preferably used in combination with at least one other accelerator component selected from phenol and phenol ethers, glycols, and alkylene glycol ethers. The glycols and alkylene glycol ethers are preferably selected from the group consisting of glycols containing from 2–4 carbon atoms per molecule, condensation dimers and trimers of such glycols, and alkylene glycol aryl ethers of the formula $RO(R'O)_nH$ where R is an aryl radical, more preferably monocyclic; R' is an alkylene radical, more preferably having from 2–6 carbon atoms; and n has an average value of at least 1 and more preferably of 1–2. Preferably, the ethers contain at least 8 carbon atoms. Various compounds illustrative of this type are ethylene glycol monophenyl ether, propylene glycol monophenyl ether, butylene glycol monophenyl ether, diethylene glycol monophenyl ether, and dipropylene glycol monophenyl ether. The alkylene glycol oligomers most preferred are di- or tri-propylene glycol.

The phenols which are preferably employed as accelerating compositions, typically in combination with a glycol or aryl ether as described above, are phenol itself (unsubstituted) or a substituted phenol in which the substituents are halogen, aryl groups containing 6 to 10 carbon atoms, alkyl or alkoxy groups having 1–6 carbon atoms, or aralkyl or alkaryl groups in which the alkyl portion contains 1–6 carbon atoms and the aryl portion contains 6–10 carbon atoms.

In utilizing the stripping compositions of the present invention, the aqueous alkaline stripping solution, formulated as has been indicated hereinabove, is normally brought into contact with the substrate from which it is desired to remove the organic coating, such as paint or other protective or decorative coatings. The contact time required to effect a substantial loosening of the coating from the substrate will, of course, depend upon the nature and thickness of the coating which is to be removed. In some instances, contact times of a few minutes, e.g. 2 to 3 minutes, may be sufficient, while with other and more difficultly removable coatings, appreciably longer contact times, e.g., 30 minutes or more, up to 2–3 hours, may be necessary or desirable. Accordingly, it is not possible to give specific contact times which are used, inasmuch as the contact time will, in each instance, be that which will effect a substantial loosening of the coating on the surface.

In this respect, it is to be noted that it is not essential that the stripping solutions of the present invention remain in contact with the coated substrate for a period sufficient to effect complete removal of the coatings from the substrate. It is only necessary that the contact times be sufficient to effect a loosening of the organic coating or film on the substrate, so that it may then be removed by brushing, high pressure water spray, or the like.

In order to achieve a practically useful stripping rate, it is desirable to increase the pH of the working stripping composition. However, this increase in pH will increase the danger of damaging the appearance of the substrate, particularly if the substrate is highly polished and/or reflective. It has been found that the relative value of the alkalinity of a concentrate formulation according to this invention may be conveniently measured by determining the pH of a 4% by volume solution of the concentrate in deionized water. With increasing preference in the order given, the pH of such a test solution made from the concentrate will be not less than 11.4, 11.46, 11.59, 11.78, 12.00, 12.17, 12.30, 12.39, 12.48, 12.55, 12.60, or 12.63 and independently will be not more than 13.2, 13.10, 13.02, 12.95, 12.90, 12.84, 12.80, 12.74, 12.70, or 12.66. The preferences for the pH of working stripping compositions according to the invention are the same as those for test solutions of the concentrates as given immediately above.

Generally, it is desirable that the contact between the stripping solution and the substrate from which the coating is to be removed is effected by immersing the substrate in the stripping solution. In this manner, a thorough and continuous wetting of the substrate by the stripping solution is obtained with little or no loss of the stripping solution. In some instances, however, particularly when less difficultly removable films are involved, other contact techniques, such as spraying, flooding, or the like may be used.

Desirably, the stripping solution is at an elevated temperature when it is brought into contact with the substrate from which a protective film is to be removed. Preferably, the solution is at a temperature which is close to its boiling point, with temperatures within the range of about 90 to 100 degrees Centigrade being typical. It will be appreciated, however, that in many instances, either higher or lower temperatures, e.g. room temperature, may also be used.

Once the protective coating on the substrate has been substantially loosened by contact with the stripping solution and the coating has been removed from the substrate, either by retaining the stripping solution in contact with the coating until complete removal is obtained or by utilizing other removal techniques on the loosely adhering coating, the substrate may then be recoated with a new protective coating. Generally, however, it is preferred that the surface first be water rinsed, so as to remove any of the alkaline stripping solution which may still be retained on the surface.

It was also found that in stripping coatings, either base coat or clear coat paint, from aluminum wheels using the silicate containing alkaline concentrate to which boric acid was added in accordance with the present invention, and employing an accelerator composition, such as a mixture of triethanolamine and phenoxyethanol, the addition of certain surfactants to the stripping composition had a significant effect on stripping time, and thereby the efficiency of the stripping operation. Particularly effective surfactants were the alkyl polyglycosides, such as APG ™ 325 available from the Emery Division of Henkel Corporation, and aromatic sulfonates, such as sodium cumene sulfonate.

The surfactants may be employed in amounts up to 50 grams/liter of the aqueous stripping solution with about 5 to 10 g/l being preferred for the aqueous stripping solution formulated at 15-20 volume percent of the concentrate with water. These surfactants are also useful in alkaline cleaning compositions, in which they may be employed in an amount of 1 to 10 g/l in a 1-20 volume percent solution of the concentrate in water.

The invention and its advantages can be further illustrated by means of the following examples and comparison examples, in which all parts and percentages are by weight unless otherwise specified.

EXAMPLE AND COMPARISON EXAMPLE GROUP 1

A series of concentrate compositions were prepared with and without boric acid and one in which borax was employed in place of the boric acid. The specific compositions are shown in Table 1.

These concentrates were made up into aqueous stripping solutions at 15% by volume and stripping tests were conducted at 93.3° C. to determine the extent of attack on two aluminum alloys, 3003 sheet stock and 325 casting alloy. The aluminum panels were immersed in the stripping solution for 30 minutes.

In this series, comparative Samples 1, 2 and 5 showed significant attack of the aluminum substrate. Sample 5, which was substantially the same as Example 4,

TABLE 1

| | % By Weight | | | | |
|---|---|---|---|---|---|
| Sample: | 1 | 2 | 3 | 4 | 5 |
| Component: | | | | | |
| Deionized water | 66.67 | 30 | 62.31 | 30 | 30 |
| Sodium metasilicate .5H$_2$O | 33.33 | 30 | 31.15 | 30 | 30 |
| Gluconic acid | — | 5 | — | 5 | 3 |
| Silicate F (3.22/1SiO$_2$/Na$_2$O) | — | 35 | — | 30 | 30 |
| Boric Acid | — | — | 6.54 | 5 | — |
| Borax .5H$_2$O | — | — | — | — | 7 |

TABLE 1-continued

| | % By Weight | | | | |
|---|---|---|---|---|---|
| Sample: | 1 | 2 | 3 | 4 | 5 |
| pH of Concentrate | 13.65 | 13.26 | 13.25 | 12.51 | 13.06 | but employed borax in place of the boric acid, illustrates that sodium borate is not effective. In Samples 3 and 4, with boric acid, no attack occurred with Sample 3 while Sample 4 showed very slight attack for 3 minutes, then none.

EXAMPLE GROUP 2

In this series, the amount of boric acid was varied. Sample 7 is the same as Sample 5 above, except that boric acid is employed at 7% instead of the borax of Sample 5. Sample 6 illustrates the effect of decreased boric acid with increased high ratio (3.22/1, SiO$_2$/Na$_2$O) silicate. The complete compositions are shown in Table 2.

TABLE 2

| | % By Weight | |
|---|---|---|
| Samples: | 6 | 7 |
| Component: | | |
| Deionized water | 25 | 30 |
| Sodium metasilicate .5H$_2$O | 20 | 30 |
| Silicate F | 50 | 30 |
| Gluconic acid | 3 | 3 |
| Boric acid | 2 | 7 |
| pH of concentrate | 12.2 | 12.15 |

In testing in the same manner as in Example 1, Sample 7 showed no aluminum attack. In Sample 6, there was slight attack for 10 minutes, then none.

EXAMPLE AND COMPARISON EXAMPLE GROUP 3

In this example, the concentrates employed from 15-25% of aqueous KOH solution containing 45% of KOH along with Kasil #1, a potassium silicate having an SiO$_2$/K$_2$O ratio of 2.5/1. Samples 8, 9, and 11 also employed tetrasodium pyrophosphate in addition to the potassium hydroxide. For comparison purposes, Sample 8 and 9 employed no boric acid while Sample 12 employed no silicate. The concentrate compositions are shown in Table 3.

TABLE 3

| | % By Weight | | | | |
|---|---|---|---|---|---|
| Sample: | 8 | 9 | 10 | 11 | 12 |
| Component: | | | | | |
| Deionized water | 10 | 10 | 10 | 10 | 65 |
| 45% KOH Sol'n | 25 | 15 | 25 | 20 | 25 |
| Kasil #1 | 50 | 50 | 50 | 50 | — |
| Tetrasodium Pyrophosphate | 10 | 20 | — | 10 | — |
| Gluconic acid | 5 | 5 | 5 | 5 | 3 |
| Boric Acid | — | — | 10 | 5 | 7 |
| pH of Concentrate | 13.58 | 13.72 | 12.28 | 12.68 | 14 |

After testing in the same manner as in Group 1, Samples 10 and 11 illustrating the present invention showed no aluminum attack whereas comparative Samples 8, 9 and 12 showed aluminum attack, with Sample 12 containing no silicate showing vigorous attack.

The foregoing examples illustrate that the alkaline stripping composition containing silicate and boric acid will eliminate, or minimize, attack of a metal substrate such as aluminum. The examples also illustrate that substitution of the boric acid by its sodium salt, borax (Sample 5), does not provide the same protection as boric acid itself. Sample 12 which showed vigorous attack illustrates the necessity of the presence of silicate. The examples accordingly illustrate the desirability and effectiveness of a silicate-containing, alkaline, stripping composition containing boric acid in an amount effective to reduce attack on a metal substrate such as aluminum and/or raise the stripping rate without increasing the degree of attack on the metal substrate.

EXAMPLE GROUP 4

This example group serves to illustrate the effect of certain surfactants on stripping time and efficiency, when employed with a composition of the present invention, illustrated by adding surfactants to stripping compositions prepared from the concentrate of Sample 10. In this example, a stripping solution was prepared with 20% by volume of Sample 10 and also 10% by volume of an accelerator (73% of 2-phenoxyethanol and 27% triethanolamine). The surfactants were added to the stripping composition so formulated in an amount of 5 g/l. The stripping was evaluated by stripping base coat and clear coat paint from aluminum wheels by immersion at 93.3° C. until substantial removal of the paint coat from the aluminum surface was achieved. The results are given in Table 4.

In contrast, a naphthalene sulfonate (Petro BA) and the sodium salt of a phosphate ester (Triton TM H 66) showed no significant improvement. These examples illustrate the unexpected effectiveness of the polyglycoside and the cumene sulfonate surfactants, with lesser effectiveness of the phosphate ester or other sulfonates.

EXAMPLE AND COMPARISON EXAMPLE GROUP 5

These examples and comparison examples illustrate the effect of various amounts of phosphates on concentrate compositions. Phosphates are less strongly alkaline than silicates, and compositions in which phosphate is substituted for some of the silicate are not as

TABLE 4

| | | Stripping Time (minutes) | % Stripped |
|---|---|---|---|
| 1. | No surfactant addition | 169 | 100 |
| 2. | Alkyl polyglycoside (Emery APG TM 325) | 110 | 100 |
| 3. | Sodium cumene sulfonate (Naxonate TM SC) | 102 | 100 |
| 4. | Sodium dodecyl benzene sulfonate (Calsoft TM L-60) | 165 | 100 |
| 5. | Phosphate ester (acid form) (Triton TM Q5-44) | 164 | 100 | effective in stripping, as illustrated in Table 5 below.

TABLE 5

| | Weight Percent of Ingredient in Sample No.: | | | | | |
|---|---|---|---|---|---|---|
| Ingredient | 13 | 14 | 15 | 16 | 17 | 18 |
| Deionized Water | 60 | 50 | 50 | 50 | 50 | 60 |
| Na₃PO₄.12H₂O | — | — | 20 | — | — | 20 |
| Na₃PO₄ | — | — | — | 20 | — | — |
| Na₂SiO₃.5H₂O | 40 | 40 | 20 | — | — | 20 |
| Na₂SiO₃ | — | — | — | 20 | 40 | — |
| H₃BO₃ | — | 10 | 10 | 10 | 10 | — | pH of 4% by

TABLE 5-continued

| Sample Number | Change in Mass of Aluminum Panel Immersed in Sample | Visual Evidence of Attack on Aluminum Panel | Volume Solution of Sample |
|---|---|---|---|
| 13 | Lost 0.767 gram | Strong attack | 13.2 |
| 14 | Lost 0.0032 gram | No attack | 12.4 |
| 15 | Gained 0.0031 gram | No attack | 11.2 |
| 16 | Gained 0.027 gram | No attack | 12.5 |
| 17 | Lost 0.8 gram | Strong attack | 13.2 |
| 18 | Lost 0.0256 gram | Moderate attack | 13.0 |

| | Stripping Time Needed for 20% by Volume Solutions of Sample + 10% by Volume of Accelerator (Mixture of 73% of 2-phenoxyethanol and 27% triethanolamine) at 93.3° C. To Strip Duracron TM 200 Acrylic Applied Over a Conversion Coating: | |
|---|---|---|
| Sample Number | of Zinc Phosphate | of Iron Phosphate |
| 14 | 43 minutes | 57 Minutes |
| 15 | 70 minutes | 93 minutes |

EXAMPLE AND COMPARISON EXAMPLE GROUP 6

This is similar to Group 5, except that here the pH of the working compositions was adjusted upward with sodium hydroxide, and two different alloys were tested for visual evidence of attack. The base concentrate compositions and the dilution and mixing thereof to make working compositions were otherwise the same as for Samples 14 (silicate) and 15 (mixed silicate and phosphate) in Table 5. The compositions and results are shown in Table 6.

TABLE 6

| | Visual Evidence of Attack on: | | |
|---|---|---|---|
| pH | Alloy 7075 | Alloy 6061 | Stripping[1] Time, Minutes |
| | Compositions Based on Sample 15[2] | | |
| 11.6 | No | No | |
| 11.8 | No | No | |
| 12.0 | No | No | |
| 12.2 | No | No | |
| 12.4 | No | No | |
| 12.6 | No | No | 87 |
| 12.8 | Slight | No | |
| 13.0 | Strong | Slight | |
| | Compositions Based on Sample 14[3] | | |
| 12.4 | No | No | |
| 12.6 | No | No | 63 |
| 12.8 | Strong | Strong | |
| 13.0 | Strong | Strong | |

[1]Stripping conditions and the substrate stripped were the same as in Group 5, except that only zinc phosphate conversion coated substrates were used.
[2]The pH without any addition of NaOH was 11.33.
[3]The pH without any addition of NaOH was 12.2

In addition to the slower stripping speed results shown in Table 6, these experiments revealed another disadvantage of compositions containing such a large fraction of phosphate: Attempted additions of even small amounts of sodium hydroxide to such compositions often resulted in formation of a precipitate, while no such problem occurred with the silicate based compositions not containing phosphate.

EXAMPLE AND COMPARISON EXAMPLE GROUP 7

These examples illustrate the use of acids other than boric acid. A base concentrate consisting of 40% NaSi- O₃.5 H₂O in deionized water was first prepared. Solutions of 20% by volume of this concentrate in tap water were then prepared and found to have pH of 13.5. Three samples of this 20% by volume solution of the base concentrate were then reduced to a pH of 12.2 using each of boric acid, gluconic acid, and hydrochloric acid for one of the three samples. These partially neutralized samples and the unneutralized one were then heated to 93.3° C. and tested for their effect on clean, deoxidized Type 7075 T3 Aluminum panels. The unneutralized sample produced vigorous gassing from the aluminum surface and obvious attack on the surface. The sample neutralized with hydrochloric acid did not cause the surface to produce readily visible gas, but the aluminum surface had a slightly frosted appearance when removed from contact with this sample. There was no evidence of either gassing or visual blemishing of the aluminum surface from the samples neutralized with gluconic or boric acids. However, both the sample neutralized with gluconic acid and the one neutralized with hydrochloric acid formed a slight precipitate when heated to the test temperature of 93.3° C.

A volume of an accelerator (mixture of 73% of 2-phenoxyethanol and 27% of triethanolamine) equal to 10% of the sample volume was then added to each of the neutralized samples as described immediately above, and the time required for passive stripping of identical steel panels prepared with zinc phosphate conversion coating followed by application of Duracron ™ 200 Acrylic was then measured. The stripping time was 79 minutes for the sample neutralized with hydrochloric acid, 66 minutes for the sample neutralized with gluconic acid, and 54 minutes for the sample neutralized with boric acid as most preferred.

The invention claimed is:

1. A process of stripping a solid adherent coating comprising acrylic, epoxy, vinyl, or alkyd rosins from a metal substrate on which it is coated by contacting the coating for a period of at least 2 minutes with an aqueous liquid composition of matter maintained at a temperature in the range from about 90° to about 100° C., wherein said aqueous liquid composition has a pH of at least 12.0 and consists essentially of water and:

(A) an alkaline solute component selected from the group consisting of alkali metal silicates, hydroxides, carbonates, borates, phosphates including condensed phosphates, and mixtures thereof, said alkaline solute component including alkali metal silicate constituting at least about 10% of said alkaline solute component; and (B) a dissolved product of reaction between alkali metal silicate and an acid selected from the group consisting of hydrochloric, sulfuric, nitric, phosphoric, acetic, formic, propionic, boric, and hydroxy and multihydroxy organic acids, said dissolved product of reaction being present in an amount that is at least about 2.5% of the amount of total alkali metal silicate, including the part reacted with said acid selected from the group consisting of hydrochloric, sulfuric, nitric, phosphoric, acetic, formic, propionic, boric, and hydroxy and multihydroxy organic acids, that is dissolved in the composition; and, optionally, (C) a stripping accelerant selected from the group consisting of phenols, alkylene glycols, ethers of phenols and alkylene glycols, and organic amines; and, optionally, (D) a component selected from the group consisting of gluconic acid, alkali metal gluconates and glucoheptonates, and glucono-delta-lactone; and, optionally, (E) surface active agents that are not part of components (A)–(D); and, optionally, (F) dispersing agents that are not part of components (A)–(E); and, optionally, (G) materials which impart a pleasant odor and are not part of components (A)–(F), said aqueous liquid composition having at least one of the following properties (I) and (II) with respect to a reference composition, said reference composition being composed of the same ingredients as said aqueous liquid composition except that the acid reacted to produce component (B) in the aqueous liquid composition is replaced by a fully neutralized salt of the same acid in the reference composition and the pH of the reference composition is adjusted, if necessary, to match that of the aqueous liquid composition by addition of sodium hydroxide to raise the pH or of gluconic acid to lower the pH:

(I) a test panel of highly polished aluminum coated with a standardized acrylic lacquer coating amount and thickness over a conventional zinc phosphate conversion coating, when immersed in the aqueous composition at a temperature of 93° C., is passively completely stripped of its coating within a time that is not more than 85% of the time required to strip an identically prepared-test panel with the reference composition at the same temperature, and no visually observable damage of the test panel occurs when so stripped with the aqueous composition;

(II) a test panel of highly polished aluminum coated with a standardized acrylic lacquer coating amount and thickness over a conventional zinc phosphate conversion coating, when immersed in the aqueous composition at a specified temperature for a time sufficient to completely passively strip the coating therefrom is visually observed to undergo less damage of the stripped surface than an identical panel immersed at the same temperature for the same time in the reference composition.

2. A process according to claim 1, wherein the concentration of component (A) in the total aqueous liquid composition is in the range from about 1.8–570 grams per liter, alkali metal silicates constitute at least about 37% of component (A), an mount of acid selected from the group consisting of gluconic acid and boric acid that is at least about 18% of the amount of total alkali metal silicates and that is not more than about 5.4% of the total composition is reacted to form component (B), component (C) is present in an amount that corresponds to adding to that part of the composition exclusive of component (C) an amount that is from about 0.5 to about 25% by volume of the amount of the composition exclusive of component (C), component (D) is present at a concentration in the range from about 0.24 to about 2.5% of the total composition, and the pH of the composition is in the range from 12.17–12.95.

3. A process according to claim 2, wherein the concentration of component (A) in the total aqueous liquid composition is in the range from about 36–340 grams per liter, alkali metal silicates that are selected from the group consisting of sodium and potassium silicates with a composition corresponding to a silica to alkali metal oxide ratio in the range from about 1:1 to about 3.75:1 constitute at least about 60% of component (A), an amount of boric acid that is at least about 25% of the amount of total alkali metal silicates and that is not more than about 5.4% of the total composition is reacted to form component (B), component (C) is present in an amount that corresponds to adding to that part of the composition exclusive of component (C) an amount that is from about 1.0 to about 10% by volume of the amount of the composition exclusive of component (C), and component (D) is present at a concentration in the range from about 0.24 to about 2.5% of the total composition.

4. A process according to claim 3, wherein the pH of the aqueous liquid composition is in the range from 12.30–12.84.

5. A process according to claim 4, wherein component (C) of the aqueous liquid composition consists essentially of:
  (1) from about 5 to about 75% of nitrogen compounds having the formula:

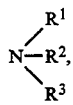

wherein each of $R^1$, $R^2$, and $R^3$ is independently selected from the group consisting of (i) hydrogen and of (ii) hydroxyalkyl and hydroxyalkoxy moieties having from 2 to 10 carbon atoms in each moiety and a terminal hydroxyl group in each moiety, except that at least one of $R^1$, $R^2$, and $R^3$ is not hydrogen; and
  (2) from about 95 to about 25% of materials selected from the group consisting of glycols containing from 2–4 carbon atoms per molecule, condensation dimers and trimers of such glycols, aryloxy alcohols, and alkylene glycol aryl ethers of the formula $RO(R'O)_nH$ where R is a monocylic aryl radical, R' is an alkylene radical having from 2–6 carbon atoms, and n has an average value of at least 1.

6. A process according to claim 5, wherein component (C) of the aqueous liquid composition consists essentially of triethanolamine and 2-phenoxyethanol.

7. A process according to claim 3, wherein component (C) of the aqueous liquid composition consists essentially of:
  (1) from about 5 to about 75% of nitrogen compounds having the formula:

wherein each of $R^1$, $R^2$, and $R^3$ is independently selected from the group consisting of (i) hydrogen and of (ii) hydroxyalkyl and hydroxyalkoxy moieties having from 2 to 10 carbon atoms in each moiety and a terminal hydroxyl group in each moiety, except that at least one of $R^1$, $R^2$, and $R^3$ is not hydrogen; and
  (2) from about 95 to about 25% of materials selected from the group consisting of glycols containing from 2–4 carbon atoms per molecule, condensation dimers and trimers of such glycols, aryloxy alcohols, and alkylene glycol aryl ethers of the formula $RO(R'O)_nH$ where R is a monocylic aryl radical, R' is an alkylene radical having from 2–6 carbon atoms, and n has an average value of at least 1.

8. A process according to claim 7, wherein component (C) of the aqueous liquid composition consists essentially of triethanolamine and 2-phenoxyethanol.

9. A process according to claim 2, wherein component (C) of the aqueous liquid composition consists essentially of:
  (1) from about 5 to about 75% of organic amines; and
  (2) from about 95 to about 25% of materials selected from the group consisting of (i) phenol (ii) substituted phenols in which the substituents are halogen, aryl groups containing 6 to 10 carbon atoms, alkyl or alkoxy groups having 1–6 carbon atoms, or aralkyl or alkaryl groups in which the alkyl portion contains 1–6 carbon atoms and the aryl portion contains 6–10 carbon atoms, and (iii) alkylene glycols and ethers thereof.

10. A process according to claim 9, wherein the aqueous liquid composition includes from about 5 to about 10 grams per liter of surfactant material selected from the group consisting of alkyl polyglycosides and alkali metal salts of aryl sulfonic acids.

11. A process according to claim 10, wherein the aqueous liquid composition includes from about 5 to about 10 grams per liter of surfactant material selected from the group consisting of alkyl polyglycosides and alkali metal salts of cumene sulfonic acid.

12. A process according to claim 9, wherein the aqueous liquid composition includes from about 5 to about 10 grams per liter of surfactant material selected from the group consisting of alkyl polyglycosides and alkali metal salts of cumene sulfonic acid.

13. A process according to claim 8, wherein the aqueous liquid composition includes from about 5 to about 10 grams per liter of surfactant material selected from the group consisting of alkyl polyglycosides and alkali metal salts of cumene sulfonic acid.

14. A process according to claim 7, wherein the aqueous liquid composition includes from about 5 to about 10 grams per liter of surfactant material selected from the group consisting of alkyl polyglycosides and alkali metal salts of cumene sulfonic acid.

15. A process according to claim 6, wherein the aqueous liquid composition includes from about 5 to about 10 grams per liter of surfactant material selected from the group consisting of alkyl polyglycosides and alkali metal salts of cumene sulfonic acid.

16. A process according to claim 5, wherein the aqueous liquid composition includes from about 5 to about 10 grams per liter of surfactant material selected from the group consisting of alkyl polyglycosides and alkali metal salts of cumene sulfonic acid.

17. A process according to claim 4, wherein the aqueous liquid composition includes from about 5 to about 10 grams per liter of surfactant material selected from the group consisting of alkyl polyglycosides and alkali metal salts of cumene sulfonic acid.

18. A process according to claim 3, wherein the aqueous liquid composition includes from about 5 to about 10 grams per liter of surfactant material selected from the group consisting of alkyl polyglycosides and alkali metal salts of cumene sulfonic acid.

19. A process according to claim 2, wherein the aqueous liquid composition includes from about 5 to about 10 grams per liter of surfactant material selected from the group consisting of alkyl polyglycosides and alkali metal salts of cumene sulfonic acid.

20. A process according to claim 1, wherein the aqueous liquid composition includes from about 5 to about 10 grams per liter of surfactant material selected from the group consisting of alkyl polyglycosides and alkali metal salts of cumene sulfonic acid.

* * * * *

UNITED STATES PATENT AND TRADEMARK OFFICE
CERTIFICATE OF CORRECTION

PATENT NO. : 5,391,234
DATED : Feb. 21, 1995
INVENTOR(S) : Murphy

It is certified that error appears in the above-indentified patent and that said Letters Patent is hereby corrected as shown below:

In claim 1, column 13, line 37, "rosins", should read:
-- resins --.

Signed and Sealed this

Eleventh Day of July, 1995

Attest:

BRUCE LEHMAN

Attesting Officer          Commissioner of Patents and Trademarks